United States Patent
Asbag et al.

(10) Patent No.: US 11,321,633 B2
(45) Date of Patent: May 3, 2022

(54) METHOD OF CLASSIFYING DEFECTS IN A SPECIMEN SEMICONDUCTOR EXAMINATION AND SYSTEM THEREOF

(71) Applicant: Applied Materials Israel Ltd., Rehovot (IL)

(72) Inventors: Assaf Asbag, Alfei Menashe (IL); Boaz Cohen, Lehavim (IL); Shiran Gan-Or, Ganei Tiqwa (IL)

(73) Assignee: Applied Materials Israel Ltd., Rehovot (IL)

( * ) Notice: Subject to any disclaimer, the term of this patent is extended or adjusted under 35 U.S.C. 154(b) by 633 days.

(21) Appl. No.: 16/228,676

(22) Filed: Dec. 20, 2018

(65) Prior Publication Data

US 2020/0202252 A1  Jun. 25, 2020

(51) Int. Cl.
G06N 20/20 (2019.01)
G06N 20/00 (2019.01)
G06F 16/28 (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS 9,224,104 B2 * 12/2015 Lin .................. G06N 20/00
9,286,675 B1 * 3/2016 Shabtay ............ G06K 9/685
10,482,590 B2 * 11/2019 He .................. G06K 9/6292
2003/0204507 A1 10/2003 Li et al.
2004/0234120 A1 11/2004 Honda et al.
2009/0097741 A1 * 4/2009 Xu .................. G06T 7/0012
382/159

FOREIGN PATENT DOCUMENTS

WO  2018134290 A1  7/2018

OTHER PUBLICATIONS

A hybrid approach for classification of rare class data, Wankhade, 2017.*

(Continued)

*Primary Examiner* — David J Stoltenberg
*Assistant Examiner* — Michael I Ezewoko
(74) *Attorney, Agent, or Firm* — Lowenstein Sandler LLP

(57) ABSTRACT

There are provided a classifier and method of classifying defects in a semiconductor specimen. The method comprises receiving defects classified into a majority class, each having values for plurality of attributes, some defects belonging to a minority class, and some to the majority; selecting an attribute subset and defining differentiators for attributes wherein a second classifier using the subset and differentiators classifies correctly to minority and majority classes at least part of the defects; generating a training set comprising: defects of the majority and minority classes, and additional defects which the second classifier classifies as minority; training, upon the training set, subset, and differentiators, an engine obtaining a confidence level that a defect belongs to the majority class; applying the engine to second defects classified to the majority class, to obtain a confidence level of classifying each defect to the majority class; and outputting defects having a low confidence level.

19 Claims, 5 Drawing Sheets

(56) References Cited

OTHER PUBLICATIONS

Bagging-Boosting- and Hybrid-Based Approaches, Galar, 2011.*
Classification of Semiconductor Defects, Tan, 2015.*
Ensemble Learning, Krawczyk, 2017.*
Improving Decision Trees Using Confidence Intervals, Katz, 2012.*
Learning From Imbalanced Data, He, 2009.*
Random Forests, Breiman, 2001.*
Splitting Properties, Binary Trees, Breiman, 1996.*
Statistical Classification of Mammograms Using Random Forest Classifier, Vibha, 2006.*
Statistical Modeling, Breiman, 2001.*
Wirth, 1976.*
Dam, 2013.*
Edelman, 2008.*
Goffman, 1974.*
Grier, 2005_.*
Hayles, 2005_.*
Kuhn, 1962.*
Lakoff, 1980.*
Mindell, 2015_.*
Treffert, 2010.*
International Search Report and Written Opinion for Application No. PCT/IL2019/051284, dated Apr. 7, 2020, 7 pages.
Xian et al., "Zero-Shot Learning—A Comprehensive Evaluation of the Good, the Bad and the Ugly," Apr. 12, 2018, 14 pages.
Wang et al., "A Survey of Zero-Shot Learning: Settings, Methods, and Applications," ACM Trans. Intell. Syst. Technol., vol. 10, No. 2, Article 13; Jan. 2019; 37 pages.
Palatucci et al., "Zero-Shot Learning with Semantic Output Codes," Advances in Neural Information Processing Systems, 2009, 9 pages.
Demirel et al., "Attributes2Classname: A discriminative model for attribute-based unsupervised zero-shot learning," 2017 IEEE International Conference on Computer Vision (ICCV), Oct. 22-29, 2017, 10 pages.
Norouzi et al., "Zero-Shot Learning by Convex Combination of Semantic Embeddings," Mar. 21, 2014, 9 pages.
Akata et al., "Label-Embedding for Image Classification," IEEE Transactions on Software Engineering, Mar. 2015, 15 pages.
Socher et al., "Zero-Shot Learning Through Cross-Modal Transfer," Jan. 16, 2013, 10 pages.
Frome et al., "DeViSE: A Deep Visual-Semantic Embedding Model," Advances in Neural Information Processing Systems 26 (NIPS 2013), 11 pages.
Elhoseiny et al. "Write a Classifier: Zero-Shot Learning Using Purely Textual Descriptions," Dec. 2013, 8 pages.
Zhang et al., "Zero-Shot Learning via Semantic Similarity Embedding," 2015 IEEE International Conference on Computer Vision (ICCV) Sep. 16, 2015, 9 pages.
Gregory Koch, "Siamese Neural Networks for One-shot Image Recognition," Graduate Department of Computer Science, University of Toronto, 2015, 30 pages.
Bertinetto et al., "Learning feed-forward one-shot learners," 30th Conference on Neural Information Processing Systems (NIPS 2016), Barcelona, Spain, 9 pages.
Vinyals et al., "Matching Networks for One Shot Learning," 30th Conference on Neural Information Processing Systems (NIPS 2016), Barcelona, Spain, 9 pages.
Rahman et al., "14. A Unified approach for Conventional Zero-shot, Generalized Zero-shot and Few-shot Learning," Journal of Latex Class Files, vol. 14, No. 8, Aug. 2017, 15 pages.
Ian Goodfellow, "NIPS 2016 Tutorial: Generative Adversarial Networks," Dec. 31, 2016, 57 pages.
Zhai et al., "Generative Adversarial Networks As Variational Training Of Energy Based Models," Nov. 6, 2016, 12 pages.
Zhai et al., "Deep Structured Energy Based Models for Anomaly Detection," Proceedings of the 33rd International Conference on Machine Learning, New York, NY, USA, 2016, 10 pages.
Shrivastava et al., "Learning from Simulated and Unsupervised Images through Adversarial Training," 22017 IEEE Conference on Computer Vision and Pattern Recognition (CVPR), Jul. 21-26, 2017, 10 pages.
Clifton et al., "Novelty Detection With Multivariate Extreme Value Theory, Part I: An Analytical Approach To Unimodal Estimation" 2009 IEEE, 6 pages.
Clifton et al., "Novelty Detection with Multivariate Extreme Value Statistics," Aug. 13, 2010, 19 pages.
Hugueny et al., "Probabilistic Patient Monitoring with Multivariate, Multimodal Extreme Value Theory," BIOSTEC 2010, CCIS 127, pp. 199-211.
Rudd et al., "The Extreme Value Machine," IEEE Transactions on Pattern Analysis and Machine Intelligence, Mar. 2017, 12 pages.
Yun et al., "Riemannian Manifold-based Support Vector Machine For Human Activity Classification In Images" IEEE Int'l conf. on Image Processing (ICIP 2013), Sep. 15-18, Melbourne, Australia, 5 pages.
Feragen et al., "Geodesic Exponential Kernels: When Curvature and Linearity Conflict," 2015 IEEE Conference on Computer Vision and Pattern Recognition (CVPR), Jun. 2015, 11 pages.
McQueen et al., "Nearly Isometric Embedding by Relaxation," 30th Conference on Neural Information Processing Systems (NIPS 2016), Barcelona, Spain, 9 pages.
Jayasumana et al., "Kernel Methods on Riemannian Manifolds with Gaussian RBF Kernels" IEEE Transactions on Pattern Analysis and Machine Intelligence, vol. 37, Issue: 12, Dec. 1, 2015, 14 pages.
Aanjaneya et al., "Metric graph reconstruction from noisy data," 27th Annual Symposium on Computational Geometry, 2011, Paris, France. pp. 37-46.
Adamaszek et al., "Metric Reconstruction Via Optimal Transport," Aug. 16, 2018, 20 pages.
Chakraborty et al., "Intrinsic Grassmann Averages for Online Linear and Robust Subspace Learning," 2017 IEEE Conference on Computer Vision and Pattern Recognition (CVPR), Jul. 21-26, 2017, 9 pages.
Silvestri et al., "A Convex Relaxation Approach to the Affine Subspace Clustering Problem," Published in GCPR 2015, 11 pages.
Micenkova et al., "Explaining Outliers by Subspace Separability," 2013 IEEE 13th International Conference on Data Mining, Dec. 7-10, 2013, 2 pages.
Rumelhart et al., "Learning Internal Representations By Error Propagation" Sep. 1985 Institute for Cognitive Science Report 8506, 49 pages.
Kingma et al., "Auto-Encoding Variational Bayes," May 1, 2014, 14 pages.
Rasmus et al., "Semi-Supervised Learning with Ladder Networks," Nov. 24, 2015, 19 pages.
Radford et al., "Unsupervised Representation Learning With Deep Convolutional Generative Adversarial Networks," Jan. 7, 2016, 16 pages.

* cited by examiner

| User\auto | Class A | Class B | Class C | Class D | Total |
|---|---|---|---|---|---|
| Class A | 52 | 4 | 4 | | 60 |
| Class B | 4 | 38 | 2 | | 44 |
| Class C | 3 | 6 | 110 | | 119 |
| Class D | 11 | 12 | 4 | | 27 |

FIG. 3

METHOD OF CLASSIFYING DEFECTS IN A SPECIMEN SEMICONDUCTOR EXAMINATION AND SYSTEM THEREOF

TECHNICAL FIELD

The presently disclosed subject matter relates, in general, to the field of examination of a specimen, and more specifically, to methods and systems capable of automated detection of defects to be classified to a monitory class of defects.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed examination of the devices while they are still in the form of semiconductor specimens.

The term "specimen" used in this specification should be expansively construed to cover any kind of wafer, mask, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

The complex manufacturing process of specimens is not error-free and such errors may cause faults in manufactured devices. Such faults may include defects that can harm operation of the device, and nuisances, which may be defects, but do not cause any harm or malfunction of the manufactured device. By way of non-limiting example, defects may be caused during the manufacturing process, due to faults in the raw material, mechanical, electrical or optical errors, human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, a defect may be classified into one of a number of classes, such as a particle, a scratch, process, or the like.

The term "majority class" used in this specification should be expansively construed to cover any kind or class of defects which occurs frequently. For example, a class may be considered a majority class if at least a predetermined number of defects of the class occur when examining a specimen, at least a predetermined part of the defects detected when examining a specimen belong to the class, the number of encountered defects belonging to the class is sufficient for training a classifier to recognize a defect as belonging to the class, or other criteria.

The term "minority class" used in this specification should be expansively construed to cover any kind or class of defects which do not occur frequently, and thus insufficient statistics are available for generating a reliable classification model by training a classifier to classify defects to this class. For example, a class may be considered a minority class if less than a predetermined number of defects of the class occur when examining a specimen, less than a predetermined part of the defects detected when examining a specimen belong to the class, the number of encountered defects belonging to the class is insufficient for training a classifier to recognize a defect as belonging to the class, or the like.

Unless specifically stated otherwise, the term "examination" used in this specification should be expansively construed to cover any kind of detection and/or classification of defects in an object. Examination is provided by using non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification, is not limited with respect to the size of the inspected area(s), to the speed or resolution of the scanning, or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different specimen locations or for the same specimen locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least some of the defects detected during the inspection phase are, typically, captured at relatively low speed and/or high-resolution, thereby enabling classification and, optionally, other analyses of the at least some of the defects. In some cases, both phases can be implemented by the same inspection tool, and, in some other cases, these two phases are implemented by different inspection tools.

GENERAL DESCRIPTION

In accordance with certain aspect of the presently disclosed subject matter, there is provided a system capable of classifying defects in a specimen into a plurality of classes, the system comprising a processing and memory circuitry (PMC) configured to: receive a plurality of defects classified by a first classifier into a majority class, wherein each defect from the plurality of defects is associated with a value for each attribute of a plurality of attributes, and wherein one or more defects from the plurality of defects belong to a minority class, and at least part of the defects from the plurality of potential defects belong to the majority class; select a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of potential defects; generate a temporary training set, the temporary training set comprising: at least part of the defects from the plurality of defects that belong to the majority class, at least part of the defects from the plurality of defects that belong to the minority class, and additional defects having attribute values for the subset such that the second classifier classifies the additional defects to the minority class; train an engine configured to obtain a confidence level that a defect characterized by first values for the subset belongs to the majority class, wherein training is performed upon the temporary training set, the subset, and the differentiator for each attribute of the subset; apply the engine to each given defect from a second plurality of potential defects that is classified to the majority class, to obtain a confidence level of classifying the given defect to the majority class; and output defects from the second plurality of potential defects having a confidence level lower than a predetermined threshold, the defects thereby assumedly belonging to the minority class. By way of non-limiting example, the PMC can be further configured to generate additional defects classifiable by the second classifier to the minority class. By way of another non-limiting example, one or more of the additional defects can be a synthetic defect, generated as a plurality of values, each value associated with an attribute from the subset, in accordance with differentiator for each attribute of the subset. By way of another non-limiting example, a value from the plurality of values assigned to an attribute can be determined as a first value between a second value of the attribute of a first defect belonging to the minority class and a third value of the attribute of a second defect neighboring the first defect and belonging to the majority class. By way of another non-limiting example, a value from the plurality of values assigned to an attribute can be determined as a first value of the attribute of a first defect belonging to the minority class. By way of another non-limiting example, the PMC can be further configured to: identify at least a part of the output defects as belonging to the minority class; update the first classifier by training the first classifier on a training set including at least some defects from the plurality of defects that belong to the minority class, at least some defects from the plurality of defects that belong to the majority class, and the part of the output defects; and output an additional defect not included in the plurality of defects, classified by the first classifier as updated to the majority class, and for which the engine obtains a confidence level below the threshold. By way of another non-limiting example, the engine can comprise a tree ensemble. By way of another non-limiting example, the differentiator can be a threshold value from a range of values. By way of another non-limiting example, the differentiator can comprise one or more values from a collection of discrete values.

In accordance with another aspect of the presently disclosed subject matter, there is provided a method of classifying defects, the method executed by a computing platform comprising a memory and a processor, the method comprising: receiving a plurality of defects classified by a first classifier into a majority class, wherein each defect from the plurality of defects is associated with a value for each attribute of a plurality of attributes, and wherein one or more defects from the plurality of defects belong to a minority class, and at least part of the defects from the plurality of potential defects belong to the majority class; selecting by the processor a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of potential defects; generating by the processor a temporary training set, the temporary training set comprising: at least part of the defects from the plurality of defects that belong to the majority class, at least part of the defects from the plurality of defects that belong to the minority class, and additional defects having attribute values for the subset such that the second classifier classifies the additional defects to the minority class; training by the processor an engine configured to obtain a confidence level that a defect characterized by first values for the subset belongs to the majority class, wherein training is performed upon the temporary training set, the subset, and the differentiator for each attribute of the subset; applying the engine to each given defect from a second plurality of potential defects that is classified to the majority class, to obtain a confidence level of classifying the given defect to the majority class; and outputting defects from the second plurality of potential defects having a confidence level lower than a predetermined threshold, the defects thereby assumedly belonging to the minority class. By way of a non-limiting example, the method can further comprise generating additional defects classifiable by the second classifier to the minority class. By way of another non-limiting example, one or more of the additional defects can be a synthetic defect, generated as a plurality of values, each value associated with an attribute from the subset, in accordance with differentiator for each attribute of the subset. By way of another non-limiting example, a value from the plurality of values assigned to an attribute can be determined as a first value between a second value of the attribute of a first defect belonging to the minority class and a third value of the attribute of a second defect neighboring the first defect and belonging to the majority class. By way of another non-limiting example, a value from the plurality of values assigned to an attribute can be determined as a first value of the attribute of a first defect belonging to the minority class. By way of another non-limiting example, the method can further comprise: identifying at least a part of the output defects as belonging to the minority class; updating the first classifier by training the first classifier on a training set including at least some defects from the plurality of defects that belong to the minority class, at least some defects from the plurality of defects that belong to the majority class, and the part of the output defects; and outputting an additional defect not included in the plurality of defects, classified by the first classifier as updated to the majority class, and for which the engine obtains a confidence level below the threshold. By way of another non-limiting example, the engine can be comprised in a random forest classifier. By way of another non-limiting example, the differentiator can be a threshold value from a range of values. By way of another non-limiting example, the differentiator can comprise one or more values from a collection of discrete values.

In accordance with another aspect of the presently disclosed subject matter, there is provided a non-transitory computer readable medium comprising instructions that, when executed by a computer, cause the computer to perform a method of automated classifying defects in a specimen into a plurality of classes, the method comprising: receiving a plurality of defects classified by a first classifier into a majority class, wherein each defect from the plurality of defects is associated with a value for each attribute of a plurality of attributes, and wherein one or more defects from the plurality of defects belong to a minority class, and at least part of the defects from the plurality of potential defects belong to the majority class; selecting by the processor a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of potential defects; generating by the processor a temporary training set, the temporary training set comprising: at least part of the defects from the plurality of defects that belong to the majority class, at least part of the defects from the plurality of defects that belong to the minority class, and additional defects having attribute values for the subset such that the second classifier classifies the additional defects to the minority class; training, by the processor, an engine configured to obtain a confidence level that a defect characterized by first values for the subset belongs to the majority class, wherein training is performed upon the temporary training set, the subset, and the differentiator for each attribute of the subset; applying the engine to each given defect from a second plurality of potential defects that is classified to the majority class, to obtain a confidence level of classifying the given defect to the majority class; and outputting defects from the second plurality of potential defects having a confidence level lower than a predetermined threshold, the defects thereby assumedly belonging to the minority class.

An advantage of certain embodiments of the presently disclosed subject matter relates to monitoring a success criteria or measure set by a user, the success criteria related to automated defect classification. Some non-limiting examples of success criteria include classification purity of one or more classes, classification accuracy of one or more classes, and extraction.

Another advantage relates to optimizing the classification results in accordance with user requirements, by correcting the effect of an imbalanced training set, by identifying further defects of one or more minority classes, and classifying correctly defects which have been unclassifiable prior to utilizing the disclosure.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3 illustrates a confusion matrix of defect classification, in accordance with certain embodiments of the presently disclosed subject matter;

DETAILED DESCRIPTION OF EMBODIMENTS

Figure 1:
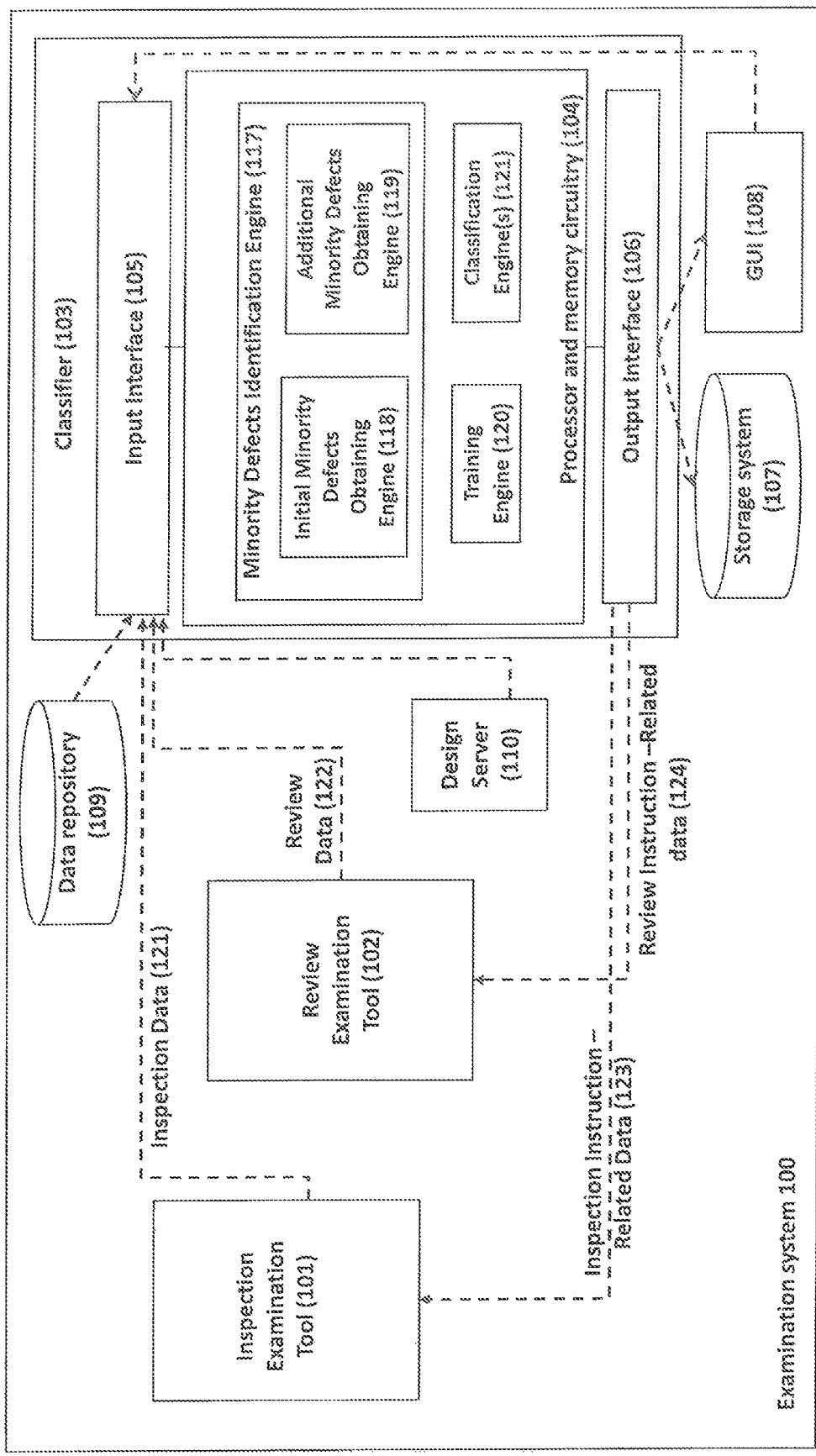
FIG. 1 illustrates a generalized block diagram of an examination system in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "calculating", "generating", "assigning", "selecting", "determining", "receiving", "training", "applying", "outputting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the classifier and PMC therein disclosed in the present application.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The term "defect" in a specimen used in this specification should be expansively construed to cover any kind of abnormality or undesirable feature formed on or within a specimen.

The term "known to belong to a class" used in this specification should be expansively construed to cover any classification of a defect to a class which is considered ground truth, for example classification made by a human user, classification made by a trusted classifier, or the like.

The term "classification" used in this specification should be expansively construed to cover any assignment of a defect to one of a plurality of predetermined classes. Typically, a classifier is trained upon defects known to belong to each of the required classes. Once training is done, the classifier can be used for classifying defects into any of the classes, whether it is known which class the defect belongs to or not.

A given defect can belong to a majority class or a minority class. When applying a classifier to a set of detects, most of the defects will be automatically classified by the classifier to majority classes. However, due to an insufficient number of training defects which are known to belong to minority classes, many minority defects will also be erroneously classified to majority classes. Since only a fraction of the defects detected during inspection are further examined during review, the probability of a minority defect classified to a majority class to be reviewed is low.

The under-representation of defects of certain populations, e.g., minority classes, when training a classifier, is thus a serious concern in the fabrication and examination process, for a number of reasons.

First, wrong classification may lead to inaccurate evaluation of the quality of the examination process. Due to the low representation of minority defects, the impact of minority defects on the process evaluation is low, therefore the quality of the whole process may be inaccurately evaluated.

Second, the stability of the examination process may be low: as smaller populations are more vulnerable to changes when defects are misclassified, a small number of defects, or even a single defect, may significantly affect the standard deviation of the process evaluation. It is thus hard to stably evaluate the examination process.

Third, the mere classification errors cause defects which may be too severe to go unhandled. Moreover, significant efforts are put into eliminating some very severe defects, resulting in fewer remaining defects of these types. Thus, if such defects are under-represented in the training process, further defects will not be classified to their classes, which may cause severe problems in the specimen to go unnoticed; and Fourth, certain types of defects, although referred to as belonging to the same class, may have different characteristics. For example, defects of type "particle" may be significantly different in metal and in silicone. By not identifying and training specific minority classes, important information related to particular defects may be lost.

Bearing this in mind, attention is drawn to FIG. 1 illustrating a generalized block diagram of an examination system in accordance with certain embodiments of the presently disclosed subject matter. Examination system 100 illustrated in FIG. 1 can be used for examination of a specimen (e.g. of a wafer and/or parts thereof) as a part of specimen fabrication. Examination can be part of the object fabrication, and can be carried out during manufacturing of the object, or afterwards. The examination system can comprise a variety of examination tools, for example, one or more inspection examination tools 101 configured to capture inspection images (typically, at relatively high speed and/or low resolution), and one or more review examination tools 102 configured to capture review images of at least part of defects detected by inspection tools 101 (typically, at relatively low speed and/or high resolution). The illustrated examination system 100 further comprises a computer-based automated defect classifying tool (referred to hereinafter also as a classifier) 103 capable of automatically classifying defects into a plurality of classes in accordance with the defects type. By way of non-limiting example, classification may have different purposes, and the classification results can be used to identify specific defects of interest (DoI), filter false defects from true defects, establish Pareto in order to identify excursions in statistical process control (SPC), and/or otherwise, in accordance with classification purposes.

A user can define the classes and the defects assigned to each class for training a classification engine 121 with the help of GUI 108. Further, GUI 108 may be configured to enable the user (and/or management system) to set and monitor success criteria or measures related to automated defect classification, such as purity, accuracy, extraction, or other parameters separately for each class, and to optimize the classification results in accordance with user requirements.

Classifier 103 can be operatively connected to one or more inspection tools 101 and/or one or more review tools 102. Optionally, classifier 103 can be fully or partly integrated with one or more inspection tools 101 or with one or more review tools 102. Classifier 103 can be further operatively connected to design server 110 and data repository 109.

A specimen can be examined by inspection tool 101 (e.g. an optical inspection system, low-resolution SEM, etc.). The resulting images and/or derivatives can be processed (optionally together with other data as, for example, design data and/or defect classification data) to select potential defects for review.

A subset of potential defect locations selected for review can be reviewed by review tool 102 (e.g. a scanning electron microscope (SEM) or Atomic Force Microscopy (AFM), etc.). Data (referred to hereinafter as review data 122) informative of review images and/or derivatives thereof and respective associated metadata can be transmitted—directly or via one or more intermediate systems—to classifier 103. It is noted that review data can include data generated by the one or more intermediate systems as derivatives of review images.

Classifier 103 comprises a processor and memory circuitry (PMC) 104 operatively connected to a hardware-based input interface 105 and to a hardware-based output interface 106. PMC 104 is configured to provide processing necessary for operating the classifier as further detailed with reference to FIG. 2, and comprises a processor and a memory (not shown separately within PMC 104). Operation of classifier 103 and PMC 104 will be further detailed with reference to FIGS. 2-4.

Processing results of Classifier 103 output by output interface 106, may be provided as inspection instruction related data 123 or review instruction related data 124 to inspection examination tools 101 or review examination tools 102, respectively, in order to change their operation, for example by changing values of operation parameters.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of the examination tools 101 and/or 102, data repositories 109, storage system 107, design server 110 and/or GUI 108 can be external to the examination system 100 and operate in data communication with classifier 103 via input interface 105 and output interface 106. Classifier 103 can be implemented as a stand-alone computer(s) to be used in conjunction with one or more examination tools. Optionally, classifier 103 can operate on pre-acquired review data stored in data repositories 109 and/or storage system 107. Alternatively or additionally, the respective functions of classifier 103 can, at least partly, be integrated with one or more examination tools, process control tools, recipe generation tools, systems for automatic defects review and/or classification, and/or other systems related to examination.

PMC 104 can comprise minority defect identification engine 117, training engine 120 and one or more classification engines 121. Minority defect identification engine 117 can be used for identifying minority defects which can be used by training engine 120 to train one or more classification engines 121.

Minority defect identification engine 117 can comprise initial minority defects obtaining engine 118 for identifying minority defects for which ground truth exists, and which are erroneously classified by a classification engine 121 to majority classes. Minority defect identification engine 117 can further comprise additional minority defects obtaining engine 119 configured to identify defects that are likely to be minority defects, but for which no ground truth exists. A user can then review these defects, and determine whether any one or more of the defects is indeed a minority defect. Once a sufficient number of minority class defects are available, training engine 120 can be used for training a classification engine, also referred to as classifier 121.

PMC 104 can comprise training engine 120 configured to receive a multiplicity of defects each with a corresponding classification, and output a classifier adapted to receive a defect and provide a class to which the defect is classified.

PMC 104 can comprise one or more classification engines 120, also referred to as classifiers, which may be trained by training engine 118 or by another training engine, or received from an external source. As detailed below, one such engine can be an initial engine trained with an insufficient number of minority defects, and another engine can be trained with further defects.

Figure 2:
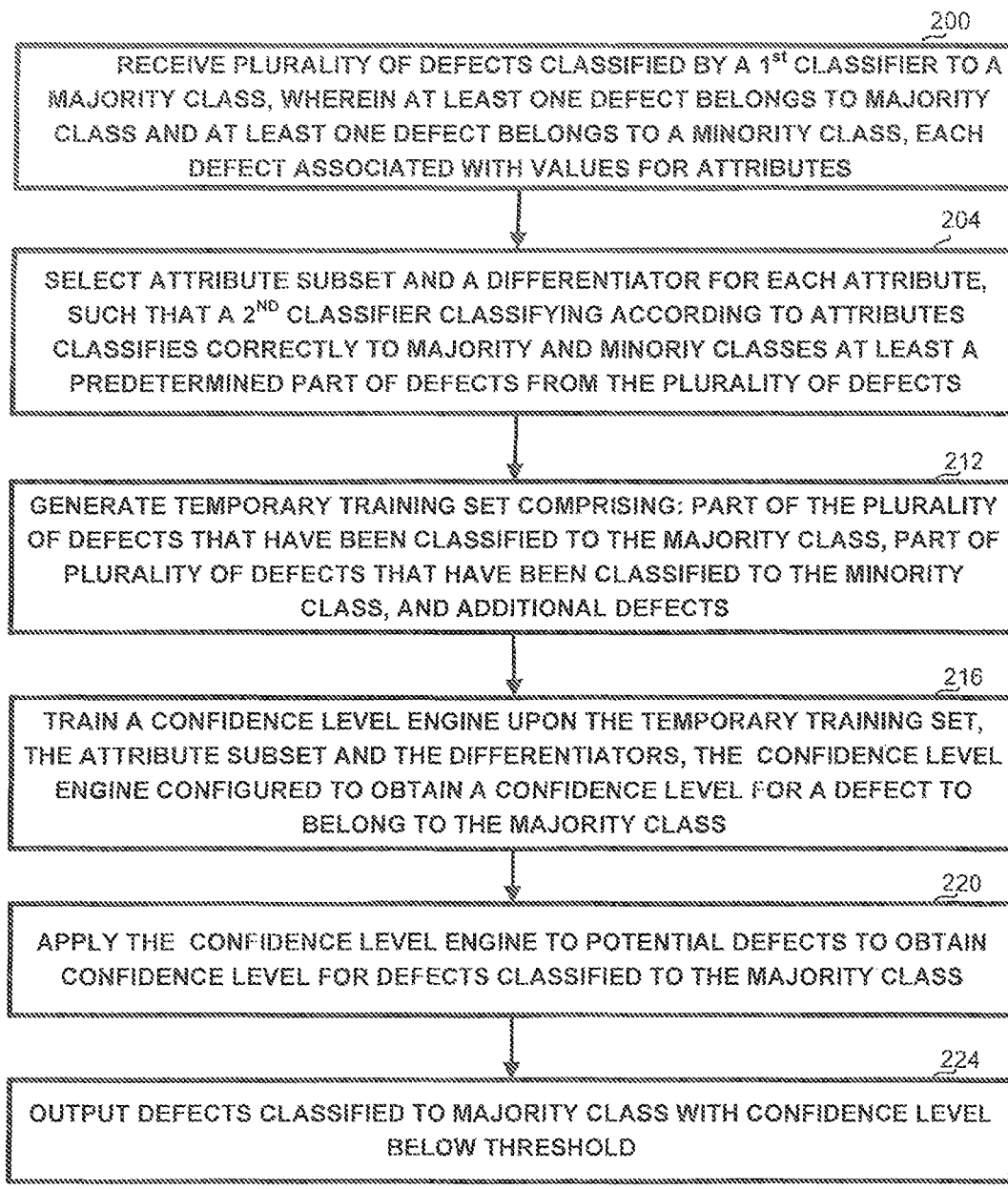
FIG. 2 illustrates a generalized flow-chart of a method of identifying defects that may belong to a minority class, in accordance with certain embodiments of the presently disclosed subject matter.

Referring to FIG. 2, there is illustrated a generalized flow-chart of operating minority defects identification engine 117 in accordance with certain embodiments of the presently disclosed subject matter. PMC 104 is configured to execute the respective operations detailed below in accordance with computer-readable instructions implemented on a non-transitory computer-readable storage medium.

Reference is now made to FIG. 3, demonstrating majority and minority classes and classification thereto, in the form of a "confusion matrix". The term "confusion matrix" should be expansively construed to cover any table layout allowing visualization of ground truth classification vs. automated classification results.

Thus, table 300 of FIG. 3 shows human vs. machine classification of a total of 250 defects, detected for example during inspection of an exemplary specimen, each defect belonging to one of classes A, B, C or D. Table 300 comprises rows 304, 308, 312 and 316, each related to defects of each class, as classified by a user, therefore this assignment to classes is referred to as "ground truth". The number of defects classified by the user are as shown in "total" column 332: 60 of Class A, 44 of Class B, 119 of Class C and 27 of Class D.

A default or any other initial classifier is also used, which classifies the defects as shown in columns 320, 324 and 328 of table 300: for example, 52 defects of Class A have been indeed classified to Class A, 2 defects of Class B have been classified as class C, and so on.

Most of the defects of Classes A, B and C are classified correctly, as shown on the first three entries of the main diagonal of table 400: 52 out of 60 for Class A, 38 out of 44 for Class B, and 110 of 119 for Class C. Thus, classes A, B, and C are considered majority classes. However, no defect, of any class, has been classified to Class D. This is likely because there were not enough defects of Class D when the classifier was trained, thus the classifier could not classify defects to this class. Thus, Class D is referred to as a minority class, and defects of this class are classified to the majority classes. It is therefore required to find more Class D defects, in order to train a classifier accordingly.

Referring now back to FIG. 2, PMC 104 receives (200) a plurality of defects which are classified by a first classifier into a first majority class. The received defects have been pre-classified into predefined classes (e.g. by a human expert and/or another classifier and/or a previous classifier's version, etc.), such that this pre-classification is considered ground truth. Thus, PMC 104 receives defects which belong to the same majority class, or to a minority class.

For example, PMC 104 may receive the defects assigned by the first classifier to one class, for example Class A shown on col. 320, and which are known to belong to class A or to class D. Defects classified to class A but belonging to other majority classes, for example the 4 defects belonging to Class B and the 3 defects belonging to Class C, are ignored. Therefore, it is required to differentiate between the 52 defects of Class A rightfully classified to Class A and the 3 defects of Class D erroneously classified to Class A.

Each defect may be described as a collection, for example a vector, of values assigned to various attributes. Typically, each defect may be described as values assigned to hundreds or more attributes, related for example to its type, color, size, location, cause, or the like.

PMC 104 can then select (204) a subset of the attributes and define a differentiator for each attribute of the subset, in order to differentiate correctly between the defects belonging to the majority class and the defects belonging to the minority class. The attribute subset selection may be referred to as dimensionality reduction. When there are more dimensions (i.e., attributes) than defects, it is mathematically possible to make such differentiation. However, reducing the number of dimensions may be useful in enhancing the generalization, e.g., the differentiation stability, such that additional defects can be classified as well to either class.

Differentiation may be described as a temporary classifier based only on the selected attribute subset, and classifying the defects into the majority and minority classes. It will be appreciated that differentiating correctly between the defects assigned to the majority class and the defects assigned to the minority class, may relate to at least a predetermined part of the majority class defects being classified to the majority class, and at least a (possibly different) predetermined part of the minority class defects being classified to the minority class. A predetermined part may relate to a predetermined percentage of the respective defects, at least a predetermined number of the respective defects, or the like.

In case an attribute may receive a sequence of values, for example a discrete or continuous range, the differentiator may be a cutoff point, such that defects having values exceeding the threshold are associated with one class, while defects having values below the threshold are associated with the other class. If the attribute may receive one of two possible values, for example 0 or 1, the differentiator may be defined such that defects having the first value for the attribute are associated with one class, while defects having the second value for the attribute are associated with the other class.

Selecting the attribute subset may use the Random Forest method, which operates by constructing a plurality of decision trees, receiving a classification result from each such decision tree, and taking a decision complying with the decision taken by a majority of the trees. At a first stage, a first tree is constructed: the first attribute may be selected in accordance with a Gini Impurity index, which may be regarded as a measure of how often a randomly chosen element from the set would be incorrectly labeled if it was randomly labeled according to the distribution of labels in the subset. For example, assume nine defects are provided, each belonging to one of two classes: "X", and "0". The nine defects have the following values for an attribute: [1, 1.5, 2, 3, 4, 5.5, 6, 8, 10]. When ordering the defects in ascending order of the values of this attribute, the defect vector is: [X X 0 X X 0 0 X 0], meaning that the first, second, fourth, fifth and eighth defects are of class "X", and the others are of class "0". A Gini Impurity index for class "X", defined as Pi*(1−Pi), for this vector, wherein Pi is the probability of correctly classified "X" is 5/9*4/9=20/81. It will be appreciated that the optimal value for the Gini Impurity index is 0, which indicates perfect differentiation by an attribute (where Pi is either 0 or 1). If the differentiator value for the attribute differentiating the vector is selected to be between 1.5 and 2, the vector would be as follows: [X X|0 X X 0 0 X 0] meaning that the defects to the left of the "I" symbol are classified as "0" and the defects to the right are of the "I" symbol are classified as "X", then a Gini Impurity index for class "X" is: 3/7*4/7=12/49. Similarly, the Gini Impurity index for class "0" is 0, and the weighted average is thus 0*2/9*12/49*7/9=0.19, meaning that the Gini index has decreased, i.e. the purity has increased.

The attribute and differentiator selection that provide the best weighted average may be selected as a first level of a decision tree. On a next level, a different attribute, or the same attribute with a different differentiating value, may be selected.

In some embodiments, only some of the defects classified to the majority class may be selected for building the random forest, rather than all of them. However, the proportion of the defects erroneously classified to the majority class that may be selected for constructing the random forest may be higher than its proportion in the defects classified to the majority class. For example, if 100 defects have been classified to the majority class, out of which two belong to the minority class and 98 to the majority class, 20 defects may be selected for the random forest, which include the two defects belonging to the minority class, and 18 defects belonging to the majority class.

A multiplicity of such trees may be constructed, each based on a different set of defects and a different selection of attributes and differentiators.

Once a predetermined number of decision trees is constructed, an attribute subset may be selected. The attribute subset may be selected based on each attribute participation in the trees: an attribute participating in more trees, or higher in one or more of the trees, may be assigned a higher grade than an attribute participating in fewer trees, or is lower in the hierarchy in one or more of the trees.

The Random Forest method may eliminate overfitting the attribute set to the available training set, wherein overfitting relates to a situation in which the attribute subset is designed to differentiate the training set well, but is therefore less effective for other defect collections.

PMC 104 can then generate (212) a temporary training set, comprising: a plurality of defects of the majority class that have been classified correctly; and a plurality of defects of the minority class that have been classified incorrectly to the majority class. In some embodiments, not all the defects classified to the majority class are selected. Moreover, the proportion of the defects of the minority class that have been classified incorrectly to the majority class may be higher than their respective part in all defects classified as majority defects. The temporary training set may also comprise additional defects.

The additional defects can be generated by PMC 104. The additional defects are defects which a classifier based on the attribute subset, such as the random forest classifier above, will classify to the minority class. Generating the additional defects may also be referred to as oversampling. It will be appreciated that generating a defect may be performed by assigning values to the attributes in the attribute subset.

Figure 4:
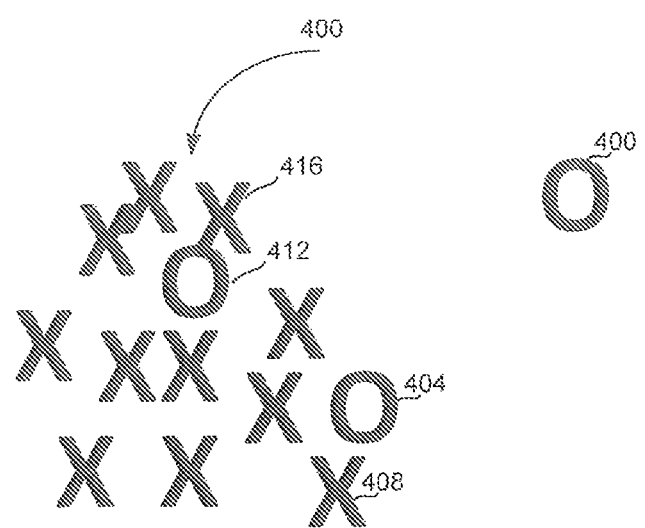
FIG. 4 illustrates exemplary two-dimensional defects upon which additional defects can be generated, in accordance with certain embodiments of the presently disclosed subject matter.
Figure 4:

Reference is now made to FIG. 4, demonstrating an exemplary embodiment of oversampling in an attribute subset comprising two dimensions.

Given a multiplicity of defects of the majority class and the minority class, oversampling may relate to generating one or more synthetic defects, i.e. one or more collections of values, each of which is relatively close to an existing minority defect. FIG. 4 shows three minority defects, 400, 404 and 412 denoted by "O", and a number of majority defects such as 408 or 416, denoted by X. In order to create a classifier that differentiates well between defects of the two classes, more synthetic defects may be generated which are closer to minority defects having neighbors of the majority class. Thus, a synthetic defect may be generated close to defects 404 and 412, but not to defect 400, which has no close neighbors of class X.

Generating synthetic defects may be performed using the Synthetic Minority Oversampling Technique (SMOTE): for each minority defect, the distance to the nearest majority defect may be calculated. The distance calculation can be performed using any required metrics, such as (possible weighted) sum of squares over the selected attribute subset. A predetermined number of minority defects may be selected having the smallest distances to the nearest neighbor of the majority class. In some embodiments, the same minority defect may be selected multiple times. Thus, minority defects 404 and 412 may be selected. For each such selected defect, a synthetic defect may be created, having values for the attribute in the range between the attribute value of the minority defect and the attribute value of the closest majority defect. In the example of FIG. 4, a synthetic defect may be created along the line connecting minority defect 404 and majority defect 408. In some embodiments, the synthetic defects may be generated closer to the minority defect, for example the value of each attribute may be calculated as 0.8*the value of attribute in minority defect+ 0.2*value of attribute in majority defect, or any other weighted combination thereof. A second synthetic defect may be generated along the line connecting minority defect 412 and majority defect 416.

PMC 104 can then train (216) a confidence level engine upon the temporary training set, the attribute subset, and the differentiator for each attribute of the subset.

The confidence level engine may be configured to receive a defect and a class to which the defect is classified, and to output a confidence level that the defect indeed belongs to the class.

The confidence level engine may also be implemented as a tree ensemble, wherein the trees of the tree ensemble may be generated using gradient boosting. Generating the decision trees may start with a default classification tree, operating in accordance with the selected attribute subset, and classifying defects to the majority class and the minority class. An enhanced Gini Impurity index may take into account a weight assigned to each class: $W_A*P_A*(1-W_AP_A)$, wherein $W_A$ is the weight assigned to class A and $P_A$ is the probability of a defect to be correctly classified to class A.

In order to train the confidence level engine to better classify defects of the minority class, the weight of the minority class may be higher than the proportion of the minority defects within all defects classified to the majority class. Further trees may then be generated, in which a higher weight is assigned to those minority defects that were incorrectly classified by previously generated trees, for example as follows:

$$w_{t+1} = \frac{\exp(-w_t Y_i * H(x_i))}{\sum \exp(-w_t Y_j * H(x_j))} w_t.$$

Giving higher weight to some defects over others may be carried out by choosing a different differentiator value, such that the resulting enhanced Gini Impurity index of the classification is higher.

The output of the confidence level engine generation is thus a collection of trees, each tree associated with a class and weight. The weight may be obtained based on the error rate associated with each tree. The error rate may be defined as the sum of the weights of the defects for which the tree outputs a result different from the ground truth.

Once the confidence level engine is available, PMC 104 can apply (220) the confidence level engine to further defects classified to the majority class, wherein no ground truth is available for these defects. Each such defect classified to the majority class is thus provided to the confidence level engine, and a confidence level is obtained. The confidence level indicates the confidence that the defect is indeed of the majority class and was not erroneously classified to the majority class. Obtaining the confidence level may be performed by classifying the defect by all trees in the tree ensemble generated at step 216, and summing the weights of all trees that classify the defect to the majority class, thus obtaining a confidence level between 0 and 1.

PMC 104 can then output (224) defects classified to the majority class, for which the confidence level is low, for example below a predetermined threshold. Alternatively, a predetermined number of defects, or a predetermined percentage of all defects classified to the majority class, that have the lowest confidence levels, may be output. A low confidence level may indicate that there is a high probability that the defect is not a majority defect, but rather a minority defect.

Figure 5:
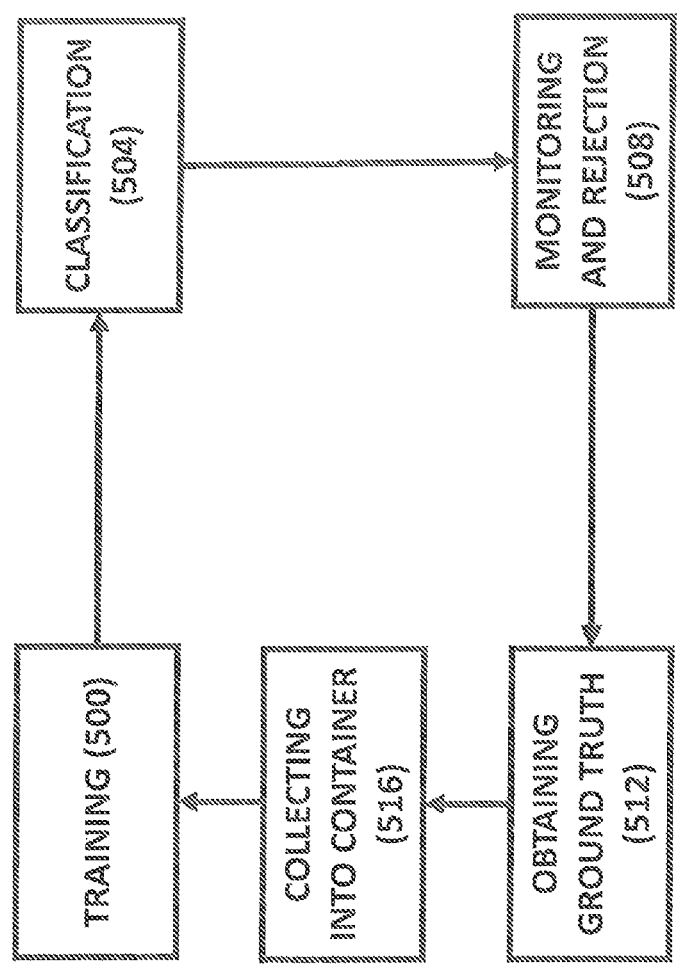
FIG. 5 illustrates a generalized flow-chart of a method of reviewing a specimen in accordance with certain embodiments of the presently disclosed subject matter.

Referring now to FIG. 5 there is illustrated a generalized flow-chart of a method of reviewing a specimen in accordance with certain embodiments of the presently disclosed subject matter.

PMC 104 can be configured to execute the respective operations detailed below in accordance with computer-readable instructions implemented on a non-transitory computer-readable storage medium.

A classifier is trained (500) upon available training data comprising training defects classified by a user.

Classification (504) is then performed for further defects, for which no classification is known.

The classification results may be monitored and rejected (508) as described in association with FIG. 2 above. Monitoring relates to obtaining a confidence level for the majority defects, for example as detailed in steps 200, 204, 212, 216 and 220 of FIG. 2, and rejection may relate to outputting (224) defects for which the classification confidence level is low.

The output defects can be reviewed, for example by a user, and ground truth classification may be received (512) for these defects.

The defects indicated by a user as minority defects may be collected (516) and saved in a storage device or a data structure, referred to as a "container". When a number of minority defects sufficient for training is accumulated in a container, for example at least a predetermined number, such as 30, 40, 100 or the like, a new classifier can be trained in which this class is also a majority class, and which may thus classify correctly also the minority defects. This classifier may thus replace the first classifier.

Training (500) can then be repeated, which may also be referred to as re-training or updating the classifier, with the available ground truth classification.

The iterations of FIG. 5 may continue for a predetermined number of times, for a predetermined period of time, until the rejection rate drops below a first predetermined threshold, until the number of rejections drops below a second predetermined threshold, or until another stopping criteria is met.

Those skilled in the art will readily appreciate that the teachings of the presently disclosed subject matter are not bound by the methods illustrated in FIG. 2 and FIG. 5. Other appropriate algorithms and combinations thereof can be implemented in order to obtain minority defects and train a classifier accordingly.

The invention is not limited to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A system capable of classifying defects in a semiconductor specimen into a plurality of classes, the system comprising a processing and memory circuitry (PMC) configured to:

receive a plurality of defects classified by a first classifier into a majority class, wherein each defect from the plurality of defects is associated with a value for each attribute of a plurality of attributes, and wherein one or more defects from the plurality of defects belong to a minority class indicative of a ground truth of the one or more defects, and at least part of the defects from the plurality of defects belong to the majority class indicative of a ground truth of the at least part of the defects;

select a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of defects;

generate a temporary training set, the temporary training set comprising: at least part of the defects from the plurality of defects that are correctly classified into the majority class, at least part of the defects from the plurality of defects that belong to the minority class but are incorrectly classified into the majority class, and additional defects having attribute values for the subset such that the second classifier classifies the additional defects to the minority class;

train an engine configured to obtain a confidence level that a defect characterized by first values for the subset belongs to the majority class, wherein the training is performed using the temporary training set, the subset, and the differentiator for each attribute of the subset;

apply the engine to each given potential defect from a second plurality of potential defects that is classified into the majority class, to obtain a confidence level of the given potential defect belonging to the majority class; and output one or more potential defects from the second plurality of potential defects having a confidence level lower than a predetermined threshold, the one or more potential defects assumedly being incorrectly classified into the majority class and having a higher probability of belonging to the minority class.

2. The system of claim 1 wherein the PMC is further configured to generate the additional defects classifiable by the second classifier into the minority class.

3. The system of claim 1, wherein at least one of the additional defects is a synthetic defect, generated based on a plurality of values, each value associated with an attribute from the subset, in accordance with a differentiator for each attribute of the subset.

4. The system of claim 3, wherein a value from the plurality of values assigned to an attribute is determined as a first value between a second value of the attribute of a first defect belonging to the minority class, and a third value of the attribute of a second defect neighboring the first defect and belonging to the majority class.

5. The system of claim 3, wherein a value from the plurality of values assigned to an attribute is determined as a first value of the attribute of a first defect belonging to the minority class.

6. The system of claim 1, wherein the PMC is further configured to:
identify at least a part of the output potential defects as belonging to the minority class;
update the first classifier by training the first classifier on a training set including at least some defects from the plurality of defects that belong to the minority class, at least some defects from the plurality of defects that belong to the majority class, and the part of the output potential defects; and
output an additional defect not included in the plurality of defects, classified by the first classifier as updated to the majority class, and for which the engine obtains a confidence level below the predetermined threshold.

7. The system of claim 1, wherein the engine comprises a tree ensemble.

8. The system of claim 1, wherein the differentiator is a threshold value from a range of values.

9. The system of claim 1, wherein the differentiator comprises one or more values from a collection of discrete values.

10. A method of classifying defects in a semiconductor specimen into a plurality of classes, the method executed by a computing platform comprising a memory and a processor, the method comprising:
receiving a plurality of defects classified by a first classifier into a majority class, wherein each defect from the plurality of defects is associated with a value for each attribute of a plurality of attributes, and wherein one or more defects from the plurality of defects belong to a minority class indicative of a ground truth of the one or more defects, and at least part of the defects from the plurality of potential defects belong to the majority class indicative of a ground truth of the at least part of the defects;
selecting by the processor a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of defects;
generating by the processor a temporary training set, the temporary training set comprising: at least part of the defects from the plurality of defects that are correctly classified into the majority class, at least part of the defects from the plurality of defects that belong to the minority class but are incorrectly classified into the majority class, and additional defects having attribute values for the subset such that the second classifier classifies the additional defects to the minority class;
training by the processor an engine configured to obtain a confidence level that a defect characterized by first values for the subset belongs to the majority class, wherein the training is performed using the temporary training set, the subset, and the differentiator for each attribute of the subset;
applying the engine to each given potential defect from a second plurality of potential defects that is classified to the majority class, to obtain a confidence level of the given potential defect belonging to the majority class; and
outputting one or more potential defects from the second plurality of potential defects having a confidence level lower than a predetermined threshold, the one or more potential defects assumedly being incorrectly classified into the majority class and having a higher probability of belonging to the minority class.

11. The method of claim 10 further comprising generating the additional defects classifiable by the second classifier into the minority class.

12. The method of claim 11, wherein at least one of the additional defects is a synthetic defect, generated based on a plurality of values, each value associated with an attribute from the subset, in accordance with a differentiator for each attribute of the subset.

13. The method of claim 12, wherein a value from the plurality of values assigned to an attribute is determined as a first value between a second value of the attribute of a first defect belonging to the minority class, and a third value of the attribute of a second defect neighboring the first defect and belonging to the majority class.

14. The method of claim 12, wherein a value from the plurality of values assigned to an attribute is determined as a first value of the attribute of a first defect belonging to the minority class.

15. The method of claim 10, further comprising:
identifying at least a part of the output potential defects as belonging to the minority class;
updating the first classifier by training the first classifier on a training set including at least some defects from the plurality of defects that belong to the minority class, at least some defects from the plurality of defects that belong to the majority class, and the part of the output potential defects; and
outputting an additional defect not included in the plurality of defects, classified by the first classifier as updated to the majority class, and for which the engine obtains a confidence level below the predetermined threshold.

16. The method of claim 10, wherein the engine is comprised in a random forest classifier.

17. The method of claim 10, wherein the differentiator is a threshold value from a range of values.

18. The method of claim 10, wherein the differentiator comprises one or more values from a collection of discrete values.

19. A non-transitory computer readable medium comprising instructions that, when executed by a computer, cause the computer to perform a method of automated classifying defects in a semiconductor specimen into a plurality of classes, the method comprising:
receiving a plurality of defects classified by a first classifier into a majority class, wherein each defect from the plurality of defects is associated with a value for each attribute of a plurality of attributes, and wherein one or more defects from the plurality of defects belong to a minority class indicative of a ground truth of the one or more defects, and at least part of the defects from the plurality of potential defects belong to the majority class indicative of a ground truth of the at least part of the defects;
selecting, by the processor, a subset of the plurality of attributes and defining a differentiator for each attribute of the subset, such that a second classifier configured to classify defects in accordance with the subset and the differentiator for each respective attribute, classifies correctly to the minority class and the majority class at least a predefined part of defects from the plurality of defects;
generating, by the processor, a temporary training set, the temporary training set comprising: at least part of the defects from the plurality of defects that are correctly classified into the majority class, at least part of the defects from the plurality of defects that belong to the minority class but are incorrectly classified into the majority class, and additional defects having attribute values for the subset such that the second classifier classifies the additional defects to the minority class;
training by the processor an engine configured to obtain a confidence level that a defect characterized by first values for the subset belongs to the majority class, wherein the training is performed using the temporary training set, the subset, and the differentiator for each attribute of the subset;
applying the engine to each given potential defect from a second plurality of potential defects that is classified into the majority class, to obtain a confidence level of the given potential defect belonging to the majority class; and
outputting one or more potential defects from the second plurality of potential defects having a confidence level lower than a predetermined threshold, the one or more potential defects assumedly being incorrectly classified into the majority class and having a higher probability of belonging to the minority class.

* * * * *